Nov. 13, 1934. R. J. GRAY Re. 19,369

PNEUMATIC GREASE GUN

Original Filed Jan. 14, 1927 3 Sheets-Sheet 1

Inventor:
R. J. Gray.
By Whiteley and Kirkman
Attorneys

PNEUMATIC GREASE GUN

Original Filed Jan. 14, 1927 3 Sheets-Sheet 2

Inventor:
R. J. Gray.
By Whiteley and Ruckman
Attorneys.

Nov. 13, 1934. R. J. GRAY Re. 19,369
PNEUMATIC GREASE GUN
Original Filed Jan. 14, 1927 3 Sheets-Sheet 3
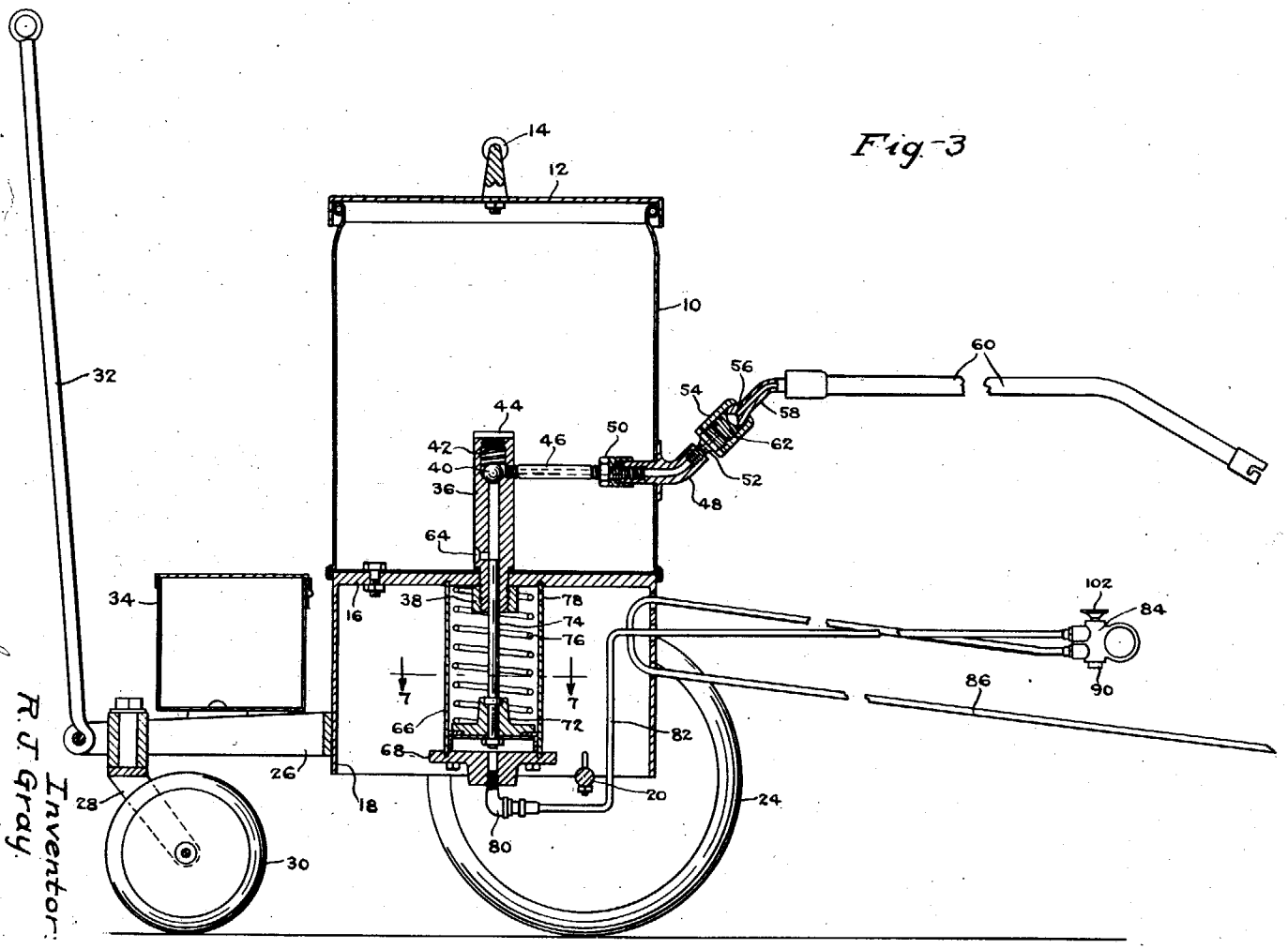
Inventor:
R. J. Gray.
By Whiteley and Ruckman
Attorneys.

Reissued Nov. 13, 1934 Re. 19,369

UNITED STATES PATENT OFFICE 19,369

PNEUMATIC GREASE GUN

Russell J. Gray, Minneapolis, Minn., assignor to Gray Company, Inc., Minneapolis, Minn.

Original No. 1,717,024, dated June 11, 1929, Serial No. 161,128, January 14, 1927. Application for reissue March 9, 1931, Serial No. 521,318

6 Claims. (Cl. 221—47.1)

My invention relates to pneumatic grease guns. An object is to provide a device of this character by means of which grease for lubricating purposes may be effectively delivered. While intended more particularly for use in lubricating parts of motor vehicles, it will be obvious that there are other places where my device may be used to advantage for obtaining efficient and timely lubrication of moving parts.

A further object of my invention is to provide a pneumatic grease gun adapted to deliver separate, successive and independent charges of grease upon successive and independent operations of a manually operable pneumatic valve intermediate the source of compressed air and the pneumatic cylinder.

A further object of my present invention is to provide a novel manually operable pneumatic control valve in combination with a pneumatic grease gun including a pneumatic cylinder having therein a spring-returned pneumatic piston, whereby an efficient control of both incoming compressed air as well as exhaust air may be effected through a single manual operation of but one controlling valve.

With the above and other objects in view, my invention consists of a pneumatic grease gun comprising a pneumatic cylinder having a pneumatic piston operatively disposed therein, said pneumatic cylinder having an air inlet passageway connected with a source of compressed air, an air-control valve-housing, operatively interposed in the path of the compressed air, intermediate its source of supply and said pneumatic cylinder; said valve-housing having an air inlet and an air outlet pneumatically insulated from each other, except for a valve-opening intermediate said air inlet and air outlet, said valve opening having a valve-seat facing said air inlet;—a valve within said valve housing in operative juxtaposition to said valve seat and adapted to be urged into closing engagement with said valve seat by compressed air admitted through said air-inlet, a valve actuating stem extending through a suitable opening in the wall of said valve-housing and extending through said valve-opening and being adapted to move the valve from its closing engagement with the valve seat against the pressure of the compressed air acting upon said valve; means actuated by said valve stem for exhausting air from said pneumatic cylinder when said valve is seated, a grease cylinder having an inlet port in communication with a source of grease supply, and having a discharge port, and a grease ejecting piston operatively disposed within said grease cylinder and related to said pneumatic piston so as to be actuated thereby.

My invention further consists of a pneumatic grease gun comprising a grease reservoir, a pneumatic cylinder disposed beneath or below the level of said grease reservoir, and rigidly secured thereto, a pneumatic piston within said pneumatic cylinder, a grease cylinder having an intake opening in communication with said grease reservoir, grease piston operatively disposed within said grease cylinder and operatively related to said pneumatic piston so as to be operated thereby to cause the intake of grease into, and the ejection of the same from, said grease cylinder, a spring adapted to urge said pneumatic piston in a direction farthest from said grease reservoir, said pneumatic cylinder having an air inlet passageway adapted for connection with a source of compressed air, and an air control valve operatively interposed between said air inlet passageway and said source of compressed air supply, said air control valve including a housing having an air inlet and an air outlet pneumatically insulated from each other except for a valve opening intermediate said air inlet and air outlet, a valve element in said housing adapted to close said valve opening by the pressure of the compressed air admitted through said air inlet, a valve actuating stem extending through a suitable opening in the wall of said valve housing and extending through said valve-opening, and being adapted to move said valve element from its closing position to an open position with respect to said valve opening, and means actuated by said valve stem for exhausting the air from said pneumatic cylinder when said valve element is in the closed position with respect to the source of compressed air.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings which illustrate a practical embodiment of my invention, Figure 1 is a side elevational view of the device.

Figure 3 is a view in vertical longitudinal section.

Figure 1:
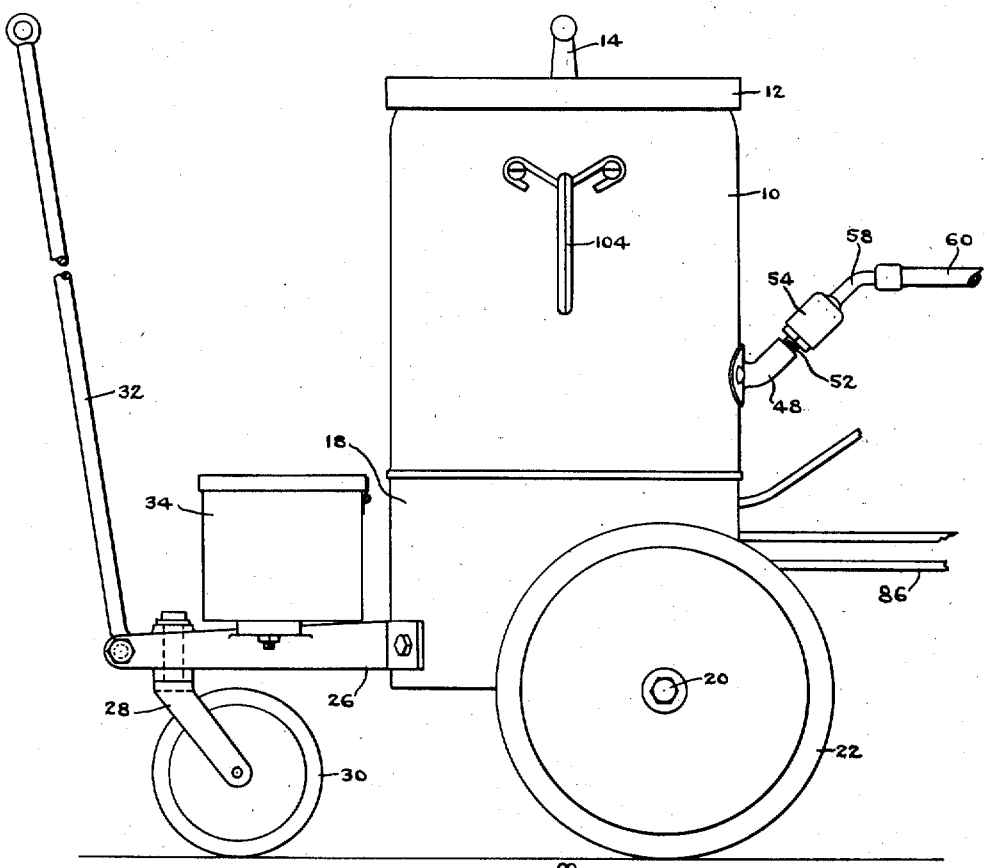
Figure 2:
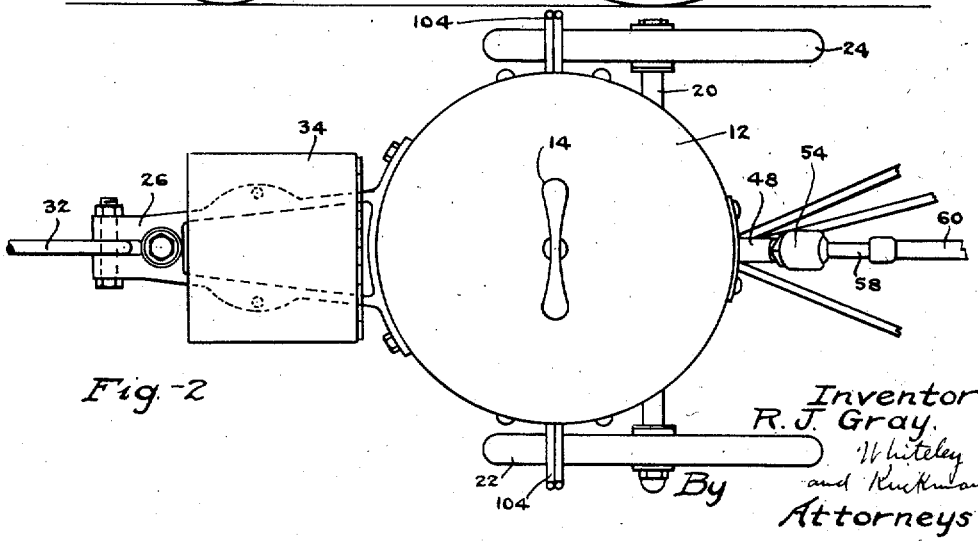
Figure 2 is a top plan view.
Figure 4:
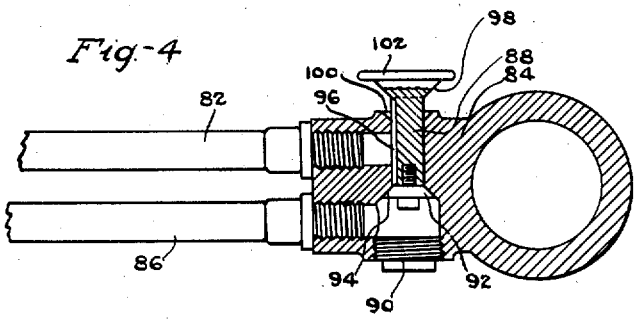
Figure 4 is a view in vertical section through a control valve showing it in open position.
Figure 5:
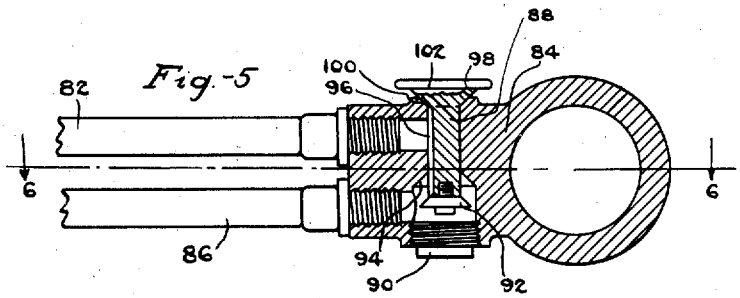
Figure 5 is a similar view but showing the valve in closed position.
Figure 6:
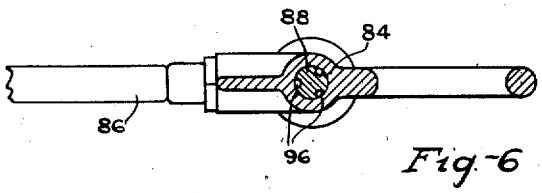
Figure 6 is a view in section on line 6—6 of Fig. 5.
Figure 7:
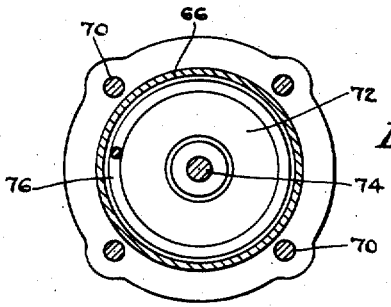
Figure 7 is a view in section on line 7—7 of Fig. 3.

Referring to the construction shown in the drawings, the numeral 10 designates a grease receptacle which is provided with a detachable cover 12 having a handle 14. The receptacle 10 is secured upon a shelf 16 formed by the upper end of an inverted cup-shaped member 18. For convenient use of the device, the receptacle is mounted on wheels and for this purpose an axle 20 is bolted to the lower margin of the member 18 and the ends of the axle are provided with wheels 22 and 24. Furthermore, to the member 18 is secured a forwardly extending frame 26 in which is swivelly mounted a fork 28 on the lower end of which a wheel 30 is rotatably mounted. A handle 32 is pivotally attached to the front end of the frame for moving the device into the desired position. A tool box 34 is mounted on the frame. A tubular member 36 is positioned in the receptacle 10 with its lower end extending through the shelf 16 and provided with a nut 38 for holding the tubular member in place. The bore of the tubular member at its upper end is enlarged to receive an upwardly opening check valve 40 normally held on its seat by a spring 42 interposed between the valve and a screw plug 44 which closes the upper end of the bore. A pipe section 46 is screwed into the wall of the tubular member 36 adjacent the valve 40. The outer end of the pipe section 46 is screwed into a pipe section 48, a packing gland 50 being provided for the engaged ends of the two pipe sections. The pipe section 48 extends through the wall of the receptacle 10 and its outer end is connected by a screw threaded coupling 52 with a socket member 54 which receives the ball-like end 56 of a pipe section 58 to the outer end of which is attached a flexible tube 60 for delivering the grease to the desired place. The socket member 54 contains a spring 62 which holds the ball member 56 firmly but adjustably in contact with the reduced outer end of the socket member. The wall of the hollow member 36 is provided with a perforation 64 located just above the bottom of the receptacle 10. A cylinder 66 is held between the shelf 16 and a head 68 secured in place by rods 70 shown in Figure 7. A piston 72 works in the cylinder 66 and this piston carries an upwardly extending rod 74 constituting a plunger which works in the bore of the hollow member 36. The piston 72 and attached plunger 74 are normally held in lowered position by a coiled spring 76. The wall of the cylinder near its upper end is provided with a perforation 78 for escape of air when the piston is raised in the manner now to be described. The head 68 is provided with a perforation to which is fitted an elbow 80 having a flexible tube 82 attached thereto. The other end of the flexible tube 82 is attached to a valve casing 84 to which is also attached a flexible tube 86 leading from any convenient source of compressed air. A stem 88 is slidably mounted in the valve casing 84 and extends through the upper wall thereof, the valve chamber being closed at the bottom by a screw plug 90. Secured to the lower end of the stem 88 is a valve 92 adapted to cooperate with a valve seat 94 so that when the valve is closed as shown in Figure 4, compressed air is prevented from passing from the tube 86 into the tube 82. When the valve is in open position as shown in Figure 5, compressed air passes from the tube 86 through longitudinal slots 96 in the valve stem 88 and goes into the tube 82. Secured to the upper end of the stem 88 is a valve 98 outside of the casing and adapted to cooperate with a seat 100 formed in the casing. The valve 98 terminates in a button 102 by means of which the stem may be slid up and down. When the stem is in the position shown in Figure 4, compressed air in the tube 82 is permitted to escape past the valve 98. The sides of the receptacle 10 are provided with hooks 104 upon which the flexible tubes may be hung when not in use.

The operation and advantages of my invention will be readily understood in connection with the foregoing description. When the device is to be used, the delivery tube 60 is attached to the place which is to be lubricated. The valve stem is then moved from the position shown in Figure 4 into that shown in Figure 5 so that compressed air passes through the tube 82 and lifts the piston 72 and attached plunger 74. The latter forces the grease which is in the tubular member 36 past the check valve 40 and through the delivery tube 60. When the stem is moved back into the position shown in Figure 4 the supply of compressed air which was delivered into the tube 82 is shut off and the pressure therein is relieved through the slots in the stem past the valve 98. The spring 76 now forces the piston and attached plunger downwardly, the check valve 40 closing at this time so that a vacuum is produced in the bore of the member 36. As soon as the plunger 74 has moved below the perforation 64, grease is drawn into the bore in the hollow member by the vacuum therein so that the device is ready for delivering another charge of grease.

One of the advantages of my novel pneumatic grease gun is the effective manual operation thereof by a single manual depression of the control valve button 102. Thus, by my novel construction and combination in a pneumatic grease gun, successive charges of grease may be discharged from the delivery end of the flexible tube or hose 60, by successive single manual operations of the valve button 102;—the intake as well as the exhaust of the compressed air being accompanied by merely the single depression of the button.

Also by means of my novel construction, a highly effective manual operative control is obtainable of the compressed air as well as the exhaust air entering and leaving the pneumatic cylinder through the same passageway, by a single manually operable control valve, the permanence, efficiency and effectiveness of which is further enhanced by reason of the exhaust air leaving the valve housing through the same opening through which the valve stem passes through the valve-housing wall, thereby eliminating all troublesome packing glands and the like;—means being provided for sealing said opening only when the compressed-air control valve is unseated or opened;—said sealing means being the secondary or auxiliary valve 98 which is pressed against the external valve seat 100 when the valve stem is depressed to open the compressed air control valve 92.

A further advantage of my invention is that a quicker, more positive and more dependable pneumatic control is obtained; with the result that the speed and ejection of successive charges of grease is increased, and with the further result that a great deal of operating trouble is eliminated in the pneumatic phase of the grease gun.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. A pneumatic grease gun comprising a hollow supporting member, a main grease receptacle mounted on the upper end of said hollow member, a detachable cover for the upper end of said receptacle, a tubular member extending up from the bottom of said receptacle, a cylinder in said hollow member extending down from the bottom of said receptacle, a piston working in said cylinder, an upwardly extending rod like plunger secured to said piston and working in said tubular member, a delivery tube extending from the upper end of said tubular member, said tubular member having a perforation in its wall adjacent the bottom of said receptacle, a spring in said cylinder normally holding said piston and plunger in lowered position, and a tube for supplying compressed air to the lower end of said cylinder.

2. A pneumatic grease gun comprising a hollow supporting member, a main grease receptacle mounted on the upper end of said hollow member, a detachable cover for the upper end of said receptacle, a tubular member extending up from the bottom of said receptacle, a cylinder in said hollow member extending down from the bottom of said receptacle, a piston working in said cylinder, an upwardly extending rodlike plunger secured to said piston and working in said tubular member, a delivery tube extending from the upper end of said tubular member out through the side wall of said main receptacle, said tubular member having a perforation in its wall adjacent the bottom of said receptacle, a spring in said cylinder normally holding said piston and plunger in lowered position, and a tube for supplying compressed air to the lower end of said cylinder.

3. A pneumatic grease gun including a pneumatic cylinder having a pneumatic piston operatively disposed therein, said pneumatic cylinder having an air inlet passageway connected with a source of compressed air, an air-control valve-housing operatively interposed in the path of the compressed air, intermediate its source of supply and said pneumatic cylinder; said valve-housing having an air inlet and an air outlet pneumatically insulated from each other, except for a valve-opening intermediate said air inlet and air outlet, said valve opening having a valve-seat facing said air inlet;—a valve within said valve housing in operative juxtaposition to said valve-seat and adapted to be urged into closing engagement with said valve-seat by compressed air admitted through said air-inlet, a manually operable valve actuating stem extending through a suitable opening in the wall of said valve-housing and being adapted to move the valve from its closing engagement with the valve seat against the pressure of the compressed air acting upon said valve to seat the same upon said valve-seat, thereby to admit compressed air into said pneumatic cylinder; means actuated by said valve-stem for automatically exhausting air from said pneumatic cylinder when said valve is seated, a grease cylinder in generally axial alignment with said pneumatic cylinder and having an inlet port in communication with a source of grease supply, and having a discharge port, a spring-pressed check-valve disposed in operative relation to said discharge port so as to limit the flow of liquid through said grease-discharge port to the direction of discharge, a flexible tube operatively connected to said discharge port, beyond said spring-pressed check-valve;—said spring-pressed check-valve being positioned between said grease-discharge port and said flexible tube, a quickly attachable and detachable conduit-coupler operatively disposed on the free end of said flexible tube, adapted for intermittent and temporary fluid-tight connection with bearings to be lubricated, and a grease ejecting piston operatively disposed within said grease cylinder and related to said pneumatic piston so as to be actuated thereby.

4. A pneumatic grease gun including a pneumatic cylinder having a pneumatic piston operatively disposed therein, said pneumatic cylinder having an air inlet passageway connected with a source of compressed air, an air-control valve-housing operatively interposed in the path of the compressed air, intermediate its source of supply and said pneumatic cylinder; said valve-housing having an air inlet and an air outlet pneumatically insulated from each other, except for a valve-opening intermediate said air inlet and air outlet, said valve opening having a valve-seat facing said air inlet; a valve within said valve housing in operative juxtaposition to said valve-seat and adapted to be urged into closing engagement with said valve-seat by compressed air admitted through said air-inlet, a manually operable valve actuating stem extending through a suitable opening in the wall of said valve-housing and being adapted to move the valve from its closing engagement with the valve-seat against the pressure of the compressed air acting upon said valve to seat the same upon said valve-seat, thereby to admit compressed air into said pneumatic cylinder; means actuated by said valve-stem for automatically exhausting air from said pneumatic cylinder when said valve is seated upon said valve-seat, a spring within said pneumatic cylinder adapted to return said pneumatic piston when said valve is seated, a grease cylinder in generally axial alignment with said pneumatic cylinder and having an inlet port in communication with a source of grease supply, and having a discharge port, a spring-pressed check-valve disposed in operative relation to said discharge port so as to limit the flow of liquid through said grease-discharge port to the direction of discharge, a flexible tube operatively connected to said discharge port, beyond said spring-pressed check-valve;—said spring-pressed check-valve being positioned between said grease-discharge port and said flexible tube, a quickly attachable and detachable conduit-coupler operatively disposed on the free end of said flexible tube, adapted for intermittent and temporary fluid-tight connection with bearings to be lubricated, and a grease ejecting piston operatively disposed within said grease cylinder and related to said pneumatic piston so as to be actuated thereby.

5. In lubricating apparatus, in combination, a pneumatic cylinder, having an air inlet passageway adapted for operative connection with a source of compressed air, a lubricant cylinder, a pneumatically operable piston in the former cylinder and a lubricant expelling piston in the latter cylinder operatively connected with each other, a manually operable air control valve operatively related to said air inlet passageway of said pneumatic cylinder, including an intake valve seat and an exhaust valve seat facing in generally opposite directions, a manually operable valve stem, an intake valve closure element and an exhaust valve closure element carried by said valve stem and extending generally transversely of the direction of movement of said valve stem, one of said valve closure elements being adapted to be seated against its corresponding valve seat and the other being adapted to be unseated from its corresponding valve seat in each of the two opposite positions of said manually operable valve stem, thereby to permit free ingress of air through said air inlet passageway into the pneumatic cylinder when the intake valve is unseated and the exhaust valve is seated, and to permit the free exhaust of air from said pneumatic cylinder when the intake valve closure element is seated and the exhaust valve closure element is unseated, and a spring operatively related to said pneumatic piston and adapted to cause the exhaust of air from said pneumatic cylinder when the intake valve closure element is seated and the exhaust valve closure element is unseated, whereby successive manual operations of said air control valve will cause the ejection of a successive series of individual charges of lubricant from said lubricant cylinder.

6. In lubricating apparatus, in combination, a pneumatic cylinder, having an air inlet passageway adapted for operative connection with a source of compressed air, a lubricant cylinder communicable with a source of lubricant, a pneumatically operable piston in the former cylinder and a lubricant expelling piston in the latter cylinder operatively connected with each other, an air control valve operatively related to said air inlet passageway of said pneumatic cylinder, including an intake valve seat and an exhaust valve seat facing in generally opposite directions, a valve stem, an air-intake valve closure and an air-exhaust valve closure carried by said valve stem and extending generally transversely of the direction of movement of said valve stem, one of said valve closures being adapted to be seated against its corresponding valve seat and the other being adapted to be unseated from its corresponding valve seat in each of the two opposite positions of said valve stem, thereby to permit free ingress of air through said air inlet passageway into the pneumatic cylinder when the intake valve closure is unseated and the exhaust valve closure is seated, and to permit the free exhaust of air from said pneumatic cylinder when the intake valve closure is seated and the exhaust valve closure is unseated;—the air-intake valve closure being adapted to be urged towards its seated position by the air pressure, and a spring operatively related to said pneumatic piston and adapted to cause the exhaust of air from said pneumatic cylinder when the intake valve closure is seated and the exhaust valve closure is unseated, whereby successive operations of said air control valve will cause the ejection of a successive series of individual charges of lubricant from said lubricant cylinder.

RUSSELL J. GRAY.